United States Patent Office 3,427,307
Patented Feb. 11, 1969

3,427,307
BENZOXAZOLE OPTICAL BRIGHTENERS
Erich Schinzel, Frankfurt am Main, Ulrich Pintschovius, Kelkheim, Taunus, and Karl Heinz Lebkucher, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Oct. 13, 1965, Ser. No. 495,703
Claims priority, application Germany, Oct. 17, 1964, F 37,032
U.S. Cl. 260—240                                      1 Claim
Int. Cl. C07d 85/48; C09b 23/10

---

ABSTRACT OF THE DISCLOSURE

There are disclosed herein 2-(cyanostyryl)-benzoxazoles having at the 5,6- or the 6,7-position a hydroaromatic 5- or 6-membered ring, which compounds are excellent optical brighteners for polyester fiber and the like synthetic fiber materials.

---

It is already known to use benzoxazole derivatives as optical brighteners. German patent specification 1,040,555 for instance, describes a process for the manufacture of $\alpha,\beta$-di-(benzoxazolyl-(2)-ethylenes which are suitable for the brightening of manmade fibers, for instance, fibers of cellulose esters, especially acetate rayon, polyacrylonitrile, polyesters or polyvinyl chloride.

U.S. pat. app. Ser. No. 286,164 Schinzel et al. discloses the use of colorless or nearly colorless fluorescent benzoxazole compounds which correspond to the general formula

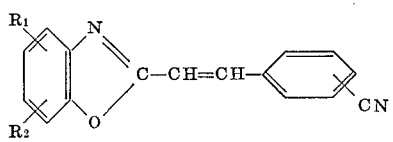

wherein the radicals $R_1$ and $R_2$ represent hydrogen, an alkyl group, an alkoxy group, an aryl group, a halogen atom or, together, may represent a condensed benzene nucleus, as optical brighteners.

Now, we have found that colorless or nearly colorless fluorescent benzoxazole compounds corresponding to the general Formula I

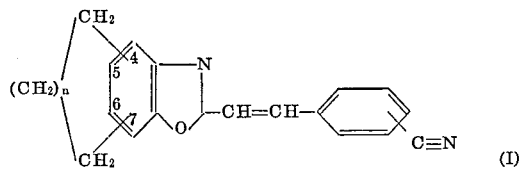

wherein $n$ represents 1 or 2 and wherein the condensed hydroaromatic ring may be in 5,6- or 6,7-position can be used as optical brighteners with extraordinary good results.

The novel compounds are distinguished by an excellent fluorescent power and a very good fastness to light in the brightening of fibrous material, above all, of polyesters of the polyethylene-glycol-terephthalate, polyamide and acetylated cellulose types. Especially good brightening properties are shown by the benzoxazoles in which the condensed hydroaromatic ring is in 5,6-position. Within said group, the compound in which $n$ stands for 1 and the cyano-group is in 4-position has to be especially considered as regards its properties.

The benzoxazoles of the general Formula I to be used as optical brighteners according to the invention can be prepared by various methods, for instance, by reacting 6-amino-indanol - (5), 5,6,7,8-tetrahydro-3-amino-naphthol-(2), 5,6,7,8-tetrahydro-2-amino-naphthol-(1) with the acid chlorides of 2-, 3- or 4-cyano-cinnamic acid and by subsequently heating the N-acyl compounds thus obtained in an atmosphere of inert gases to temperatures up to 150° to 300° C., preferably 180° to 250° C., the oxazole ring being closed with separation of water. The direct reaction of the cyano-cinnamic acids with the above-mentioned o-amino-phenols, to obtain the oxazole compounds, is likewise possible if the components are heated in known manner in the presence of acid catalysts, such as, for instance, boric acid, in inert organic solvents until the separation of water is terminated.

The optical brighteners obtained according to the process of the present invention can be used in known manner in the form of solutions in water or in organic solvents or in the form of dispersions, and if desired with the aid of dispersing agents. The necessary amounts calculated on the weight of the goods amount to 0.001 to 1.0%, preferably to 0.01 to 0.5%. The compounds can likewise be used in combination with chemical bleaching agents, for instance, oxidizing or reducing agents such as sodium chloride or sodium-dithionite.

Furthermore, the compounds obtained according to the invention can be added to commercial detergents in order to improve the appearance of the washed goods.

They can likewise be added to spinning and moulding masses which are used for the manufacture of man-made fibers, filaments, films, foils and other articles.

The following examples serve to illustrate the invention but they are not intended to limit it thereto:

Example 1

A fabric of polyethylene glycol terephthalate fibers is bleached at a goods-to-liquor ratio of 1:20 and brightened in one bath. The bleaching bath contains per liter:

| | |
|---|---|
| Sodium chlorite (100%) _____grams__ | 0.6 |
| Sodium-pyrophosphate _____do____ | 0.3 |
| Oleylmethyl-taurine (sodium salt) _____do____ | 0.15 |
| Glacial acetic acid _____milliliters__ | 0.2 |
| pH 3.5 adjusted by means of sulfuric acid. | |
| Aqueous dispersion of the Compound II (melting point 215.5° to 216.5° C.) _____grams__ | 0.15 |

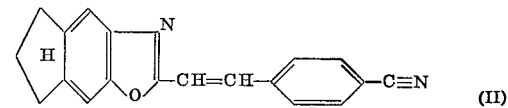

The bleaching is carried out at 85° C. for a period of 30 minutes. The bath is then heated to the boiling temperature and given a white tint within a further 30 minutes. By this process of using a single bath it is possible to increase the remission of light of the fabric by 18%, measured by means of a Zeiss-Elrepho instrument, at a wave length of 460 m$\mu$.

The compound of the Formula II can be prepared in the following way:

To a warm mixture at 75° C. consisting of 34.2 parts of 6-amino-indanol-(5), 200 parts by volume of chlorobenzene and 31 parts by volume of dimethyl-aniline, a 60° C. solution of 4-cyanacinnamic acid chloride in 220 parts by volume of chlorobenzene, prepared from 38.1 parts of 4-cyanocinnamic acid and 24 parts by volume of thionyl-chloride in chlorobenzene, is slowly added while stirred, and stirring is continued for 2 hours at 75° C. The yellow acylamino-compound is filtered off with suction at room temperature and freed by distillation of steam from adhering chlorobenzene and dimethylaniline. After filtering off with suction and drying at 105° C., 63 parts (94% of the theory) of the 4-cyano-cinnamoyl-compound of 6-amino-indanol-(5) are obtained melting at 262° to 265° C.

For converting this amide into benzoxazole it is heated under an atmosphere of nitrogen for 2 hours and 30 minutes to an internal temperature of 210° C. in 330 parts by volume of trichlorobenzene and with addition of 0.2 part of anhydrous zinc chloride as a catalyst. The melt crystallizing on cooling when still showing a temperature of 90° C. is mixed with 150 parts by volume of cyclohexane and filtered off with suction upon total cooling.

49 parts of crude 2-(p'-cyanostyryl)-indano-(5,6-d-)-oxazole II are obtained. After purification by recrystallization the substance melts at 215.5° to 216.5° C.

Example 2

A fabric of polyethylene-glycol-terephthalate bleached in the usual manner is impregnated to such a degree that the absorption of bath shown by the fabric amounts to 60% (referred to the weight of the goods), 1 liter of the padding bath containing 10 grams of an aqueous dispersion of compound II.

The goods are then treated without intermediate drying for 60 esconds in a stream of hot air of 190° C. The white tint is completely developed by this treatment so that the remission of light of 85% is increased to 100.5%, measured at 460 mμ.

Example 3

A bleached polycaprolactam fabric is bleached at a goods-to-liquor ratio of 1:20 at a temperature of 60° C. for 15 minutes. 1 liter of the washing bath contains the following additions:

| | Grams |
|---|---|
| Coconut oil alcohol with 5 mols of ethyleneoxide | 0.15 |
| Coconut oil alcohol with 8 mols of ethylene oxide | 0.30 |
| Carboxymethyl-cellulose | 0.18 |
| Sodium pyrophosphate | 0.75 |
| Sodium-tripolyphosphate | 0.75 |
| Sodium-metasilicate | 0.50 |
| Sodium-carbonate | 0.50 |
| Sodium-sulfate | 0.75 |
| Aqueous dispersion of the compound II | 0.30 |

The degree of whiteness of the fabric can be considerably increased by adding the compound II (from 85% of 100%).

We claim:
1. A compound of the formula

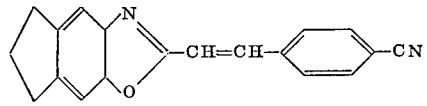

References Cited

UNITED STATES PATENTS 3,262,929  8/1966  Okubo et al. _____ 260—240

FOREIGN PATENTS 633,434  12/1963  Belgium.

JOHN D. RANDOLPH, *Primary Examiner.*

U.S. Cl. X.R.

252—301.2; 117—33.5; 260—465